United States Patent
Cappello et al.

(10) Patent No.: US 11,244,489 B2
(45) Date of Patent: Feb. 8, 2022

(54) METHOD AND SYSTEM FOR DETERMINING IDENTIFIERS FOR TAGGING VIDEO FRAMES

(71) Applicant: Sony Interactive Entertainment Inc., Tokyo (JP)

(72) Inventors: Fabio Cappello, London (GB); Oliver Hume, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/682,841

(22) Filed: Nov. 13, 2019

(65) Prior Publication Data
US 2020/0167984 A1 May 28, 2020

(30) Foreign Application Priority Data

Nov. 23, 2018 (GB) ..................... 1819100

(51) Int. Cl.
*G06T 13/40* (2011.01)
*A63F 13/57* (2014.01)
*G06T 7/73* (2017.01)

(52) U.S. Cl.
CPC .............. *G06T 13/40* (2013.01); *A63F 13/57* (2014.09); *G06T 7/75* (2017.01); *A63F 2300/6607* (2013.01); *A63F 2300/6623* (2013.01)

(58) Field of Classification Search
CPC . G06T 13/40; G06T 7/75; A63F 13/57; A63F 2300/6607; A63F 2300/6623
USPC ........................................................ 345/473
See application file for complete search history.

(56) References Cited

U.S. PATENT DOCUMENTS

| | | | |
|---|---|---|---|
| 9,827,496 B1* | 11/2017 | Zinno | A63F 13/53 |
| 10,497,163 B1* | 12/2019 | Sachania | A63F 13/52 |
| 2004/0027352 A1 | 2/2004 | Minakuchi | |
| 2010/0131078 A1* | 5/2010 | Brown | G05B 19/409 |
| | | | 700/17 |

(Continued)

FOREIGN PATENT DOCUMENTS

| | | |
|---|---|---|
| EP | 1768759 B1 | 1/2013 |
| KR | 20160012909 A | 2/2016 |

OTHER PUBLICATIONS

Extended European Search Report for corresponding EP Application No. 19190132, 8 pages, dated Dec. 10, 2019.

(Continued)

*Primary Examiner* — David T Welch
(74) *Attorney, Agent, or Firm* — Matthew B. Dernier, Esq.

(57) ABSTRACT

A method of determining identifiers for tagging frames of animation with is provided. The method comprises obtaining data indicating motion of an animated object in a plurality of frames and detecting the object as performing a pre-determined motion in at least some of the plurality of frames. For a given frame, it is determined based on the detected pre-determined motion, whether to associate an identifier with the pre-determined motion, the identifier indicating an event that is to be triggered in response to the pre-determined motion. The frames of the animation comprising the detected pre-determined motion are tagged, in response to a determination of an identifier. The pre-determined motion and corresponding identifier are determined by inputting the obtained data to machine learning model. A corresponding system is also provided.

15 Claims, 5 Drawing Sheets

(56) References Cited

U.S. PATENT DOCUMENTS

| | | | |
|---|---|---|---|
| 2011/0091070 A1* | 4/2011 | Havaldar | G06T 13/20 |
| | | | 382/103 |
| 2011/0304774 A1 | 12/2011 | Latta | |
| 2013/0044219 A1 | 2/2013 | Burry | |
| 2014/0171191 A1* | 6/2014 | Cox | A63F 13/525 |
| | | | 463/31 |
| 2015/0199978 A1* | 7/2015 | McCoy | G10L 21/10 |
| | | | 704/270 |
| 2016/0203827 A1* | 7/2016 | Leff | G06T 13/40 |
| | | | 704/207 |
| 2018/0096512 A1* | 4/2018 | Dahl | G06T 13/40 |
| 2019/0073826 A1* | 3/2019 | Bailey | G06T 17/205 |

OTHER PUBLICATIONS

Combined Search and Examination report for corresponding GB Application No. GB1819100.7, 3 pages, dated May 24, 2019.

* cited by examiner

| Bone | Transform | Value |
|---|---|---|
| Rt_shoulder01_twist_ctrl | translateX | 0.1 |
| Rt_shoulder01_twist_ctrl | translateY | 0.3 |
| Rt_shoulder01_twist_ctrl | translateZ | 5 |
| Rt_shoulder01_twist_ctrl | rotateX | 2.11 |
| Rt_shoulder01_twist_ctrl | rotateY | 0.3 |
| Rt_shoulder01_twist_ctrl | rotateZ | 0.0 |
| Rt_shoulder01_twist_ctrl | scaleX | 0.0 |
| Rt_foot_ctrl | HeelRaiseX | 0.8 |
| ... | ... | |

METHOD AND SYSTEM FOR DETERMINING IDENTIFIERS FOR TAGGING VIDEO FRAMES

BACKGROUND OF THE INVENTION

Field of the Invention

The present disclosure relates to a method and system for determining identifiers for tagging frames of an animation.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In video, there is often a need to identify specific events, so that other corresponding or subsequent events can be triggered. For example, the movement of an object in a video will typically be associated with corresponding audio. The audio may include sound effects such as e.g. speech, and footsteps or similar foley sounds such as clothing movement, etc.

In video games, characters are typically computer-generated, and so it is not possible to simply capture the audio whilst the corresponding animation of that character is being generated. Usually, an animator will have to first generate the animation and then manually tag the relevant frames for which corresponding audio is to be associated. In some video games, there may be cut-scenes in which a variety of complex visual events are taking place and the tagging of these events with corresponding audio may be a time-consuming and labour-intensive process. In fact, there are a number of video games studios for which a significant amount of time and money is spent on the manual tagging of animation frames.

An animator may also want to tag the frames of an animation for reasons other than synchronizing corresponding audio. For example, in a video game, an animator may want to tag certain frames to indicate that a character is performing a particular action (e.g. jumping), changing pose from e.g. lying down to kneeling, that their feet are touching the ground, that an interesting sequence is about to start or end, that the character is wearing a particular item, etc. These tags may be used to aid content creation and editing, or may be used directly by a game engine to trigger an event. For example, in the latter case, a tag indicating that a character is 'grabbing an object' may be used by a game engine to update the game such that the character is able to use that object in the game.

Again, tagging the frames of an animation to indicate these events can be a time-consuming and labour-intensive process for an animator. The present invention seeks to alleviate these problems.

SUMMARY OF THE INVENTION

According to a first aspect disclosed herein, there is provided a method in accordance with claim 1.

According to a second aspect disclosed herein, there is provided a system in accordance with claim 11.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 shows an example of a method for determining identifiers for tagging animation frames with;

DESCRIPTION OF THE EMBODIMENTS

Computer-generated animations are often used in different types of video content, such as the video that is output during the playing of a video game. In video games, the animation is typically of an articulated object, such as, for example, a humanoid character. The object is usually represented by a surface representation that forms the skin or mesh of the object, and a hierarchical set of interconnected bones forming the three-dimensional skeleton or 'rig' that can be manipulated by an animator so as to animate the mesh. In some cases, the bones may not be hierarchical and may simply allow one portion of the object to be configured differently with respect to another. It will be appreciated that whilst the skeleton or 'rig' may provide sufficient representation and articulation of limbs, head, torso and the like for the desired amount of animation control, it may not directly conform to an anatomical skeleton or part thereof of the represented object.

In the art of computer animation, creating and manipulating the bones of an object is referred to as rigging, whilst the binding of different parts of the mesh to corresponding bones is called skinning. In rigging, each bone is associated with a three-dimensional transformation (sometimes referred to herein as a 'transform') that defines at least one of a position, scale and orientation of a corresponding bone. The transformation may also define a parent bone to which a child bone is attached. In such cases, the transformation of the child is the product of its parent transform and its own transform. This means, for example, that if the skeleton defines a humanoid character, then movement of the thighbone will result in the lower leg being moved too. The transformations may be defined for each successive frame, for each bone, such that the temporal variation in the transformations corresponds to the object performing a particular motion.

The bones of the object are each associated with a respective portion of the object's visual representation. In the most common case of a polygonal mesh character, the bone is associated with a group of vertices; for example, in a model of a human being, the e.g. 'right upper arm' bone would be associated with the vertices making up the polygons in the model's right upper arm. Portions of the character's skin are normally associated with multiple bones, each one having a scaling factor called a vertex weight or blend weight. This process of skinning the character is typically done by a graphical processing unit (GPU), using a shader program.

Figure 1:
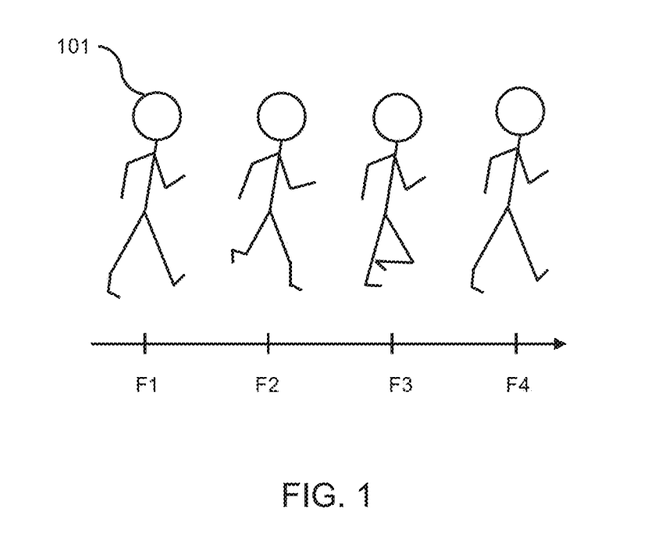
FIG. 1 shows schematically an example of a plurality of frames in which a computer-generated character is performing a walking motion.

Referring now to the drawings, wherein like reference numerals designate identical or corresponding parts throughout the several views, FIG. 1 shows an example of a plurality of frames, F1-F4, of an animated object. In FIG. 1, the object is of a human character 101 and the character has been animated so as to perform a walking motion. The animation shown in FIG. 1 may correspond to a loop-animation defined by an animator for a character in a video game. This may be, for example, the animation that is displayed in response to a player moving their character in a particular direction (in this case, to the right). Alternatively, the animation may correspond to an animation that is displayed as part of a cut-scene within the video game (i.e. where the character is not directly under the player's control).

In FIG. 1, each successive frame depicts the character at a different respective pose. The pose of the character is defined in terms of bones corresponding to the head, spine, upper arms, lower arms, upper legs, lower legs and feet, and their corresponding transformations. The transforms for each bone are defined for each frame, such that character is depicted as walking in the manner shown, as the frames are successively output for display. In the example of a video game, a character may be displayed as walking in this manner in response to a player providing a particular input (using e.g. their controller), or in response to a player reaching a certain point in the game (e.g. triggering the playing of a cut-scene). It will be appreciated that FIG. 1 is a simplified example of an animation, and that in reality the character may be non-human and/or may be formed of different bones or a different number thereof.

Figure 2:
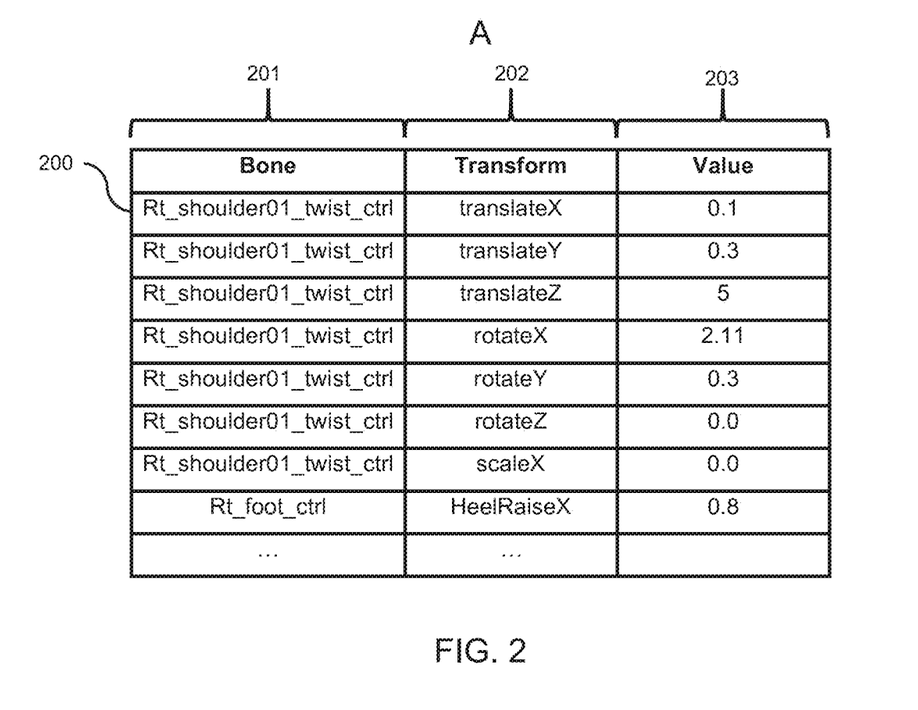
FIG. 2 shows schematically an example of data indicating the bones of a computer-generated character and the corresponding transforms of those bones.

FIG. 2 shows an example of a table 200 including the transform data for each bone of an animated character, for a given frame. The first column 201 lists the bones of the animated character. The second column 202 indicates, for each bone, a corresponding translation, rotation or scaling in the x, y or z direction. The third column 203 indicates a float value, corresponding to the degree of translation, rotation or scaling relative to a default configuration of the animated character. It should be noted that the data shown in FIG. 2 is for illustrative purposes, and does not necessarily correspond to the walking motion shown in FIG. 1. The data shown in FIG. 2 may correspond to the data generated by an animator using the Unreal Engine 4®, for example.

As mentioned previously, when an animating an object, there will be certain motions associated with corresponding events. In the example of FIG. 1, this may correspond to the outputting of a sound effect corresponding to the character's footsteps, with the sound of the character's feet hitting the surface coinciding with the frames in which that action is shown. To achieve this, an animator will usually manually tag the frames that include the relevant motion with an identifier (i.e. a label) indicating that those frames are to be associated with the corresponding audio event. This tag may allow the animator to later add music, or may act as an input to a game engine, which automatically triggers the outputting of the corresponding sound. An animator may be required to do this for each type of different motion that the character can perform, e.g. walking, skidding, jumping etc.

Each type of motion may be defined as a temporal variation in the transforms of one or more bones across a plurality of frames, and each frame may (or may not) be tagged with an identifier, indicating an event that is associated with that motion.

It should be noted that the term 'tag' is used herein to refer to an identifier, indicating a high-level description of an event occurring within one or more frames. For an instantaneous event, such as a jumping action, the identifier may be encoded as e.g. (F10, JUMP), where F10 indicates frame number 10, and the corresponding action 'Jump'. For a prolonged event, the identifier may be encoded as e.g. (F1, F10, IN_AIR), indicating that the even 'in air' has a duration between frames 1 and 10. A frame may be said to have been tagged if it has been identified as being associated with a corresponding event, and an indication of that event has been encoded (e.g. as metadata) in association with the corresponding frame. For example, a given frame may comprise data indicating the visual content, and metadata indicating an event associated with that content. Hence the frame number of a tag/identifier may be implicit based on where or how the identifier is encoded (e.g. if with the relevant frame or frames, an explicit frame number may not be needed), or may be explicit (e.g. if the tag/identifier is metadata associated with an animation loop or sequence as a whole).

For a walking loop-animation, the tagging of the frames with the relevant audio may be relatively straightforward. However, for more complicated motions, or scenes involving the interaction of multiple animated objects, the manual tagging of frames with audio events can become a time-consuming process. For example, in a video-game cut-scene, there may be multiple events such as gunshots, punches, footsteps, sounds of feet scuffing on the floor, cloth movement, etc. and an animator may need to manually identify the frames corresponding to each event, and tag the respective frames with a corresponding identifier, indicating the audio associated with that event. In some cases, this tagging process may be somewhat subjective, and the animator may need to make a judgment call as to which frames should be used to trigger a corresponding audio event. As will be appreciated, tagging the frames in this way can be a labour intensive and time-consuming (and therefore expensive) process. Moreover, as described previously, an animator may also wish to tag frames with non-audio events, thus further adding to the time and cost in producing the video content.

It would therefore be desirable if motions of an animated object associated with a corresponding identifier could be detected and the corresponding frames automatically tagged with an identifier indicating the event with which that motion is associated (or that is to be triggered, in response to the detection of that motion). The present disclosure provides a method and system for which that objective may be achieved.

Figure 3:
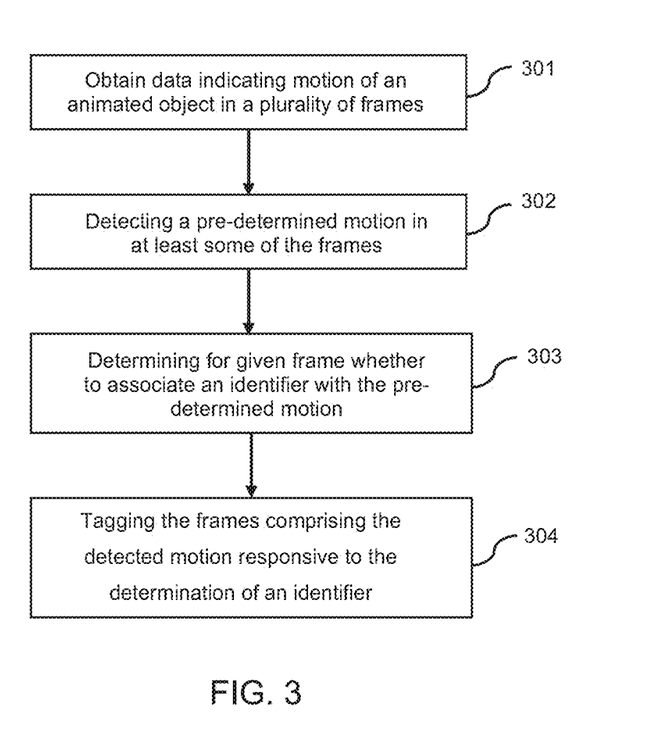

FIG. 3 shows schematically an example of a method for automatically tagging frames of an animated object with a corresponding identifier.

At a first step 301, data indicating motion of an animated object in a plurality of frames is obtained. The animated object may be a computer-generated character, and the obtained data may comprise pose data, indicating a pose of the character over successive frames. The pose data may define at least some of the bones of the character and the corresponding transforms, with each transform defining at least one of a position, orientation, scale (and optionally, parent) of a respective bone. In some examples, the pose data may define, for each frame, the transforms for each respective bone of the character. The pose data may be in the format shown in FIG. 2, for example (i.e. consist of the bones of the character, respective transforms for each bone, and a corresponding float value). It will be appreciated that equivalent forms of pose data are also considered to be within the scope of the invention, such as end-point or key-point definitions of a character pose (e.g. defining the position of a tip of a finger, toe, head etc., and relying on skeletal constraints and optionally the generated pose for a prior frame to generate the current pose), which may be preferable for use with a physics-driven game engine, for example, or video data (as also discussed later herein), from which pose data may be inferred, either from skeletal modelling or similar pose estimation techniques.

The data indicating motion of the animated object may be generated by an animator, during the development of a video game. For example, through the use of a game engine that allows animators to define characters and their animation. This data may be obtained in the sense that is it is received (e.g. as a file) at a computing device, wherein the computing device is configured to process that data (described later in relation to FIG. 5).

At a second step 302, the animated object is detected as performing a pre-determined motion in at least some of the frames. This may correspond to detecting a temporal variation in pose data as corresponding to a pre-determined motion. The motion is pre-determined in that it is known to correspond to a particular type of motion. For example, if the animated object is a character, the character may be detected as performing a motion corresponding to walking, jumping, skidding, scuffing their feet, grabbing a ledge, etc. Each of these motions may be defined as a temporal variation in the transforms of one or more bones of the character (or a range of temporal variations for one or more bones of the character). The pre-determined motion may be detected using deep learning, as will be described later.

At a third step 303, it is determined, for a given frame, whether to associate an identifier with the pre-determined motion. As described previously, the identifier provides an indication of an event that is to be associated with the pre-determined motion. The identifier may indicate an audio event, such as a sound effect or a piece of music that is to be played in synchronization with the pre-determined motion.

Alternatively or in addition, the identifier may indicate a non-audio event, such as an in-game event that is to be handled by a game engine. For example, it may be desirable to label frames in which a character is performing a certain action such as lying down or grabbing an object, so that a game engine can adjust certain aspects of gameplay to accommodate this change. In some examples, the character may be wearing clothing and there may be a need to model the cloth movement that would be expected in response to movements of the character's skeleton. It may therefore be desirable to label frames for which this cloth movement needs to be modelled, so that the corresponding motion data can be input to a corresponding cloth model.

For a given frame, the identifier is determined based on the detected pre-determined motion. For example, for each pre-determined motion there may be a corresponding identifier that is known for that motion. In some examples, a plurality of identifiers may be determined for a detected pre-determined motion. The plurality of identifiers may correspond to audio and/or non-audio events. The identifiers may correspond to metadata that is stored in association with (or as part of) the corresponding frame or frames.

In some cases, it may be that the pre-determined motion is detected as being performed across a plurality of successive frames, but that only a subset of these frames are to be associated with an identifier. For example, if a humanoid character is detected as walking, it may be desirable to associate an identifier with the frames corresponding to footfall and not the strides between. Hence, it may be that an identifier is not to be associated with the pre-determined motion in all frames, but only one or some of them. Nonetheless, the identifier itself will be determined based on the pre-determined motion.

The relationship between pre-determined motions and corresponding identifiers may be determined using a machine learning model. For example, a machine learning model may be trained to map data indicating motion of an animated object, such as a character, to corresponding identifiers. In specific examples, the machine learning model may be trained to map temporal variations in transforms of one or more bones of a character to one or more corresponding identifiers. The machine learning model may employ a convolutional neural network (CNN) or recursive neural network (RNN), for example.

In the embodiments where machine learning is used, the step of identifying a pre-determined motion may be implicit. That is, the machine learning model may be trained to generate a high-level semantic representation of the data indicating motion of the character, and to then determine an identifier that corresponds with that representation. The identifier may be determined as the identifier having a highest (and sufficiently high) confidence value. In some examples, it may be determined that the detected motion does not correspond to any identifier (e.g. all identifiers have an insufficiently high confidence value). In such a case, the motion may be said to not correspond to a pre-determined motion and there may be no event associated with the frames comprising that motion.

It will be further appreciated that the machine learning model may be trained to generate an internal representation of the data indicating pre-determined motion of the character when trained to determine the one or more most probable identifiers, if any, corresponding to the input motion data. As such, the high-level semantic representation of the data indicating motion of the character may correspond to a specific action (e.g. 'jump') as an intermediate step in the machine learning process, or may be an internal abstraction of the input motion data that the machine learning system learns to associate with an identifier indicative of e.g. 'jump', resulting in due course in a high probability output for the identifier when an appropriate input sequence is received.

It will be appreciated that the ability of the machine learning model to determine a corresponding identifier for motions of an animated object will depend on the degree of similarity between the input data and the data used for training. In some embodiments, it may be that the model is trained using the transforms of one or more bones of a humanoid character for a plurality of frames, and so is limited to determining identifiers for changes in pose of characters having this form. The applicability of the machine learning model will ultimately depend on the type and extent of data with which it is trained.

At step 304, the frame or frames comprising the pre-determined motion of the animated object are tagged with the determined identifier. That is, in response to a determination at step S302 that the pre-determined motion in a given frame is to be associated with an identifier, the corresponding frame is tagged with the identifier.

As described previously, tagging the frame or frames may involve labelling the frame(s) comprising the pre-determined motion with an identifier, indicating that those frames are associated with an event (i.e. audio or non-audio). Equivalently, the frame or frames of the input motion data that cause the machine learning system's trained internal representation of the pre-determined motion to generate a peak or above-threshold output corresponding to corresponding identifier may be used to select whether or not to tag the frame(s) with that identifier.

The frames may be saved in electronic storage in association with the corresponding identifier. Alternatively or in addition, the identifier itself may identify the frame number (or numbers) and an event associated with that frame (or those frames). The identifier may then be later input to e.g. a game engine, and used to trigger the corresponding event such that the event occurs in synchronization with the tagged frames.

Figure 4:
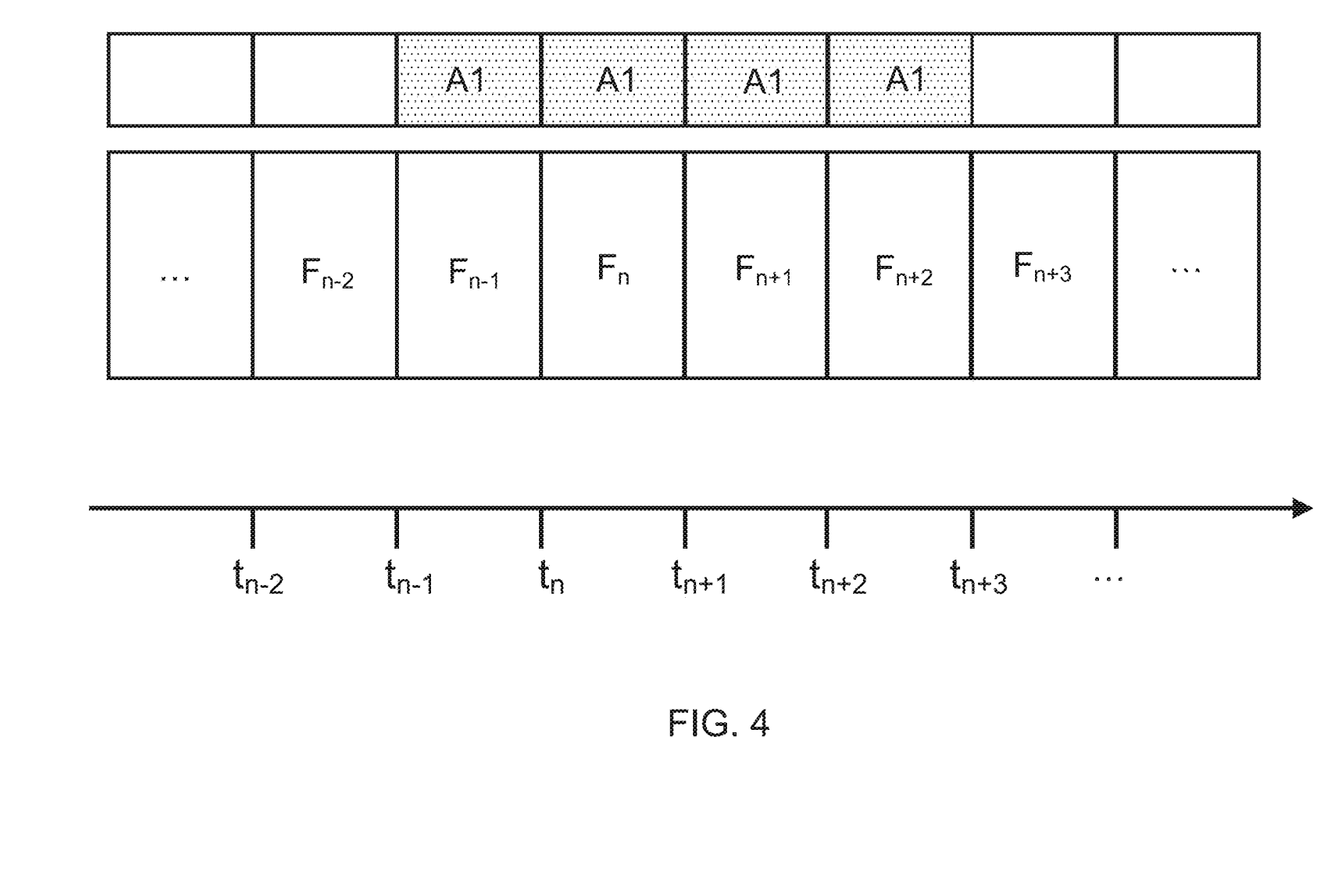
FIG. 4 shows schematically a plurality of tagged frames.

FIG. 4 shows schematically an example of a plurality of frames, $F_{n-2}$ to $F_{n+3}$, for which a subset have been tagged with the identifier 'A1'. The identifier A1 may indicate e.g. that a sound effect corresponding to A1 is output in synchronization with the frames $F_{n-1}$ to $F_{n+2}$. As described previously, the sound effect may correspond to e.g. footsteps, scuffing of feet, foley sounds such as clothing movement, character actions such as hitting, reacting, falling etc. The identifier may be encoded with each corresponding tagged frame, such that each tagged frame comprises data indicating a configuration of an animated object in that frame and an identifier indicating an event associated with that configuration.

In some examples, the method may further comprise triggering the event indicated by an identifier.

If the event is an audio event, this may involve selecting, based on the determined identifier, an audio signal (such as a sound effect or piece of music) for synchronization with the tagged frames. Once the selected audio signal has been synchronized with the tagged frames, the audio and visual content of each frame may then be output by a respective display and speakers (which may form part of the same device, or be separate devices). In the example of FIG. 1, this may correspond to displaying the animation of the character walking, with the sound effect of footsteps being synchronized with motion occurring within the animation.

In some examples, the synchronization of the audio signal with the corresponding motion may be achieved manually. For example, an animator may be required to import an audio clip and to crop and align the audio clip with the relevant tagged frames. In other examples, the determined identifier may correspond to an identifier that is known to e.g. a game engine and can be interpreted by the game engine as corresponding to one of a plurality of known audio signals (i.e. known to the game engine as corresponding to e.g. a standard sound or piece of music). In such examples, the game engine may simply cause the corresponding audio to be output at the appropriate time by reading the identifier associated with each frame, as each frame is rendered for display.

In additional or alternative examples, the method may comprise inputting the identifier to a game engine, such that the game engine adapts gameplay, based on the determined identifier.

Figure 5:
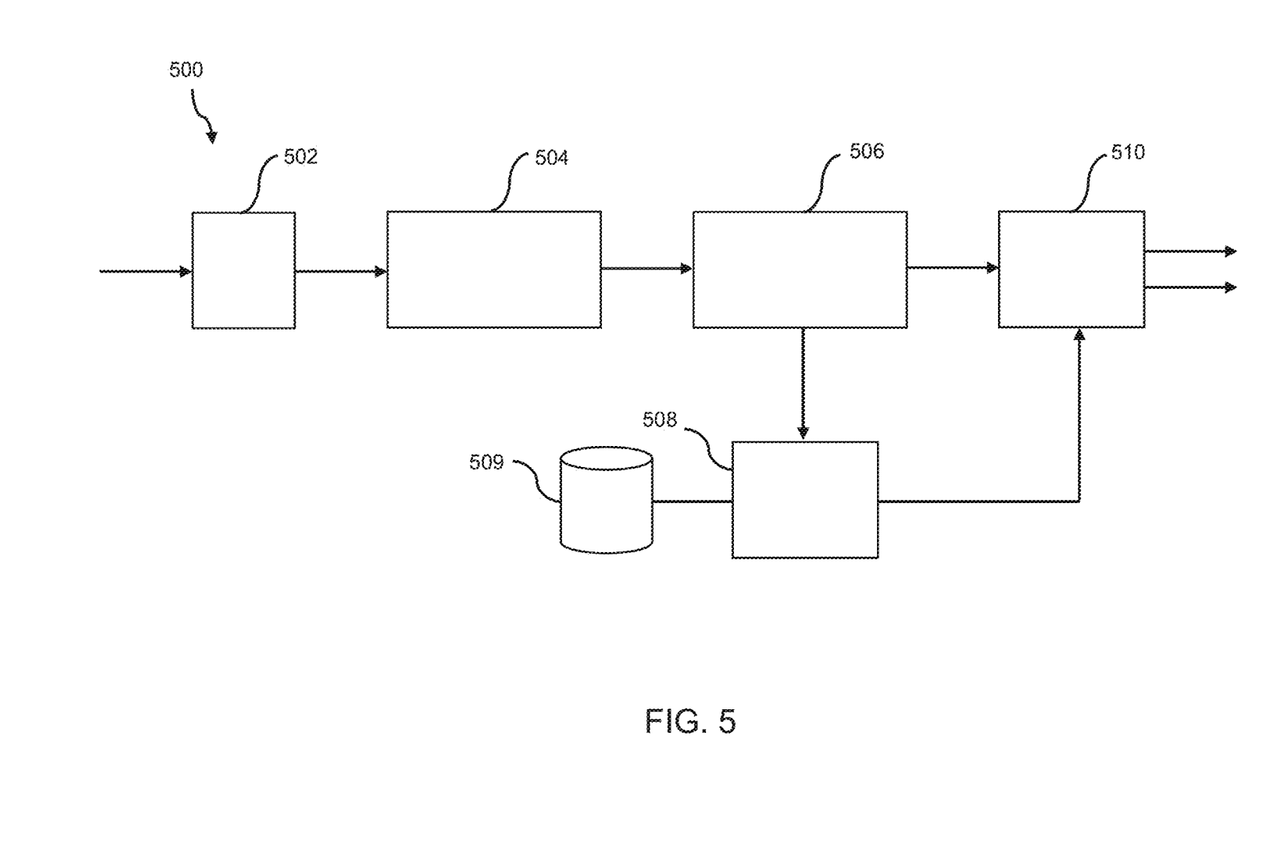
FIG. 5 shows schematically an example of a system for tagging frames of an animated object.

FIG. 5 shows schematically an example of a system 500 for tagging frames of an animation with respective identifiers. The system comprises a motion unit 502 configured to obtain data indicating motion of an animated object in a plurality of frames; a modelling unit 504 configured to identify the object as performing a pre-determined motion and to map that motion to a corresponding identifier (and/or comprising an internal abstraction of the pre-determined motion that contributes to a relevant output, as described previously); and a tagging unit 506 configured to tag the frames comprising the pre-determined motion with a determined identifier. In some embodiments, the system may further comprise a storage unit 507 for storing a plurality of sound effects (i.e. electronically) and a synchronization unit 508 configured to select a sound effect for synchronization with one or more tagged frames. The system may also comprise an output unit 510 configured to output the frames of the animated object for display and to trigger an event associated with the frames of the animated object.

The motion unit 502 is configured to obtain motion data indicating motion of an animated object. As described previously, the motion data may correspond to a pose (or configuration) of an animated object, such as a character, over a plurality of frames. In some examples, the data may define the bones of an animated character and the transforms associated with each of the character's bones, for a plurality of frames.

The motion data may have been generated by an animator or developer when generating the content, for example using a computer animation tool or a game engine for creating video game content. In FIG. 5, the motion data is shown as being input to the motion unit. The motion unit may correspond for example to one or more processors of a computing device. The computing device may be, for example, a games console, PC, smartphone, tablet, laptop, etc. The computing device may correspond to the computing device that is to render the frames of the animated object for display.

The data indicating motion of the animated object is then input to the modelling unit 504. The modelling unit 504 is configured to identify the object as performing a pre-determined motion in at least some the frames, at least implicitly as described previously, and to determine, for a given frame, whether to associate an identifier with the pre-determined motion. The modelling unit 504 may use deep learning for determining a relationship between pre-determined motions and corresponding identifiers, as described previously. In this way, the modelling unit 504 is configured to determine one or more identifiers corresponding to motions being performed by the animated object.

The modelling unit 504 may, for example, include a machine learning model that employs a convolutional or recurrent neural network, for example, or an equivalent trainable system. Prior to receiving the motion data, the model may have been trained with motion data for a large number of frames of animated objects (such as e.g. humanoid characters) and identifiers with which those frames have been tagged. This data may be used to determine a relationship between motion of animated objects, such as changes in pose, and identifiers that correspond with different types of motion.

As described previously, the model may be trained to map temporal variations in the transforms of one or more bones of an animated character to corresponding identifiers (i.e. labels). Once trained, the model may be exported to a computing device and executed locally. The computing device may include a games console, for example. Alternatively, the model may be executed at a server, and the computing device may be configured to transmit a current set of data indicating motion of an animated object to the server, and to receive from the server an indication of any identifiers and the corresponding frames with which those identifiers are associated.

As described previously, the identifier provides an indication of an event that is to be associated with, or triggered in response to, the pre-determined motion identified by the modelling unit 504. The modelling unit 504 may be configured to determine more than one identifier for a given pre-determined motion that an animated object is detected as performing.

The tagging unit 506 is configured to receive the determined identifier and tag the corresponding frames with the determined identifier. In some examples, this tagging operation may involve encoding the identifier with the frame to which that identifier corresponds (in such a case, the frame may be said to have been tagged). In other examples, this may simply involve generating metadata indicating one or more frames (e.g. frame number) and the identifier associated with the one or more frames. In other words, the metadata need not necessarily be defined as part of the frame itself.

Following the tagging of at least some of the frames of the animated object, an event corresponding to that event may be triggered. As described previously this may correspond to an audio event, such as the outputting of a corresponding audio signal, or a non-audio event, indicating an event that is to be input to a game engine, so that the game engine may adapt or adjust gameplay in some way, or perform some further modelling (such as e.g. cloth modelling).

In some embodiments, the system may comprise a storage unit 509 for storing (i.e. electronically) a plurality of sound effects and a synchronization unit for synchronizing one or more sound effects with tagged frames. The synchronization unit may be configured to synchronize a sound effect with one or more frames based on an identifier with which those frames are tagged. As described previously, this may involve, identifying the frames that are associated with a sound effect (based on the tagging) and identifying which sound effect those frames are associated with (based on the identifier itself). In some examples, this synchronization may be automatic, i.e. where the identifier is known to e.g. a game engine, or may be manual, where the identifier provides a semantic meaning to e.g. the animator or developer. Alternatively or in addition, the synchronisation unit may take other game-state information into account when selecting the sound; for example when the identifier corresponds to a footstep, then the synchronisation unit may select one from a plurality of footstep sound effects, in dependence upon a second identifier of the surface upon which the represented character is walking.

The system may further comprise an output unit for outputting audio-visual content, wherein the audio-visual content comprises the frames of the animated object (i.e. graphically) and one or more sound effects that have been synchronized with the tagged frames. In FIG. 1, the output unit is shown as receiving an input from the tagging unit and the synchronization unit. The input received from the tagging unit may include the tagged frames; the input received from the synchronization unit may include one or more selected sound effects, and an indication of the frames with which those sound effects are to be synchronized. The output unit may include a display, such as a screen, and one or more speakers for outputting the visual and audio content associated with the animation.

Training the Machine Learning Model

As described previously in relation to FIGS. 3 and 5, a machine learning model may be used for determining a relationship between data indicating motion of an animated object and identifiers indicating events associated with different types of motion. An example in which such a model has been trained will now be described, along with the results produced by the model trained in this way. It will be appreciated that this is just an example to illustrate the concept and is not intended to limit the scope of the invention to this specific example. In preferred embodiments, a much larger volume of training data would be used for training the machine learning model.

A machine learning model was trained using a relatively small dataset consisting of 1101 animations from the game Blood and Truth®. The data for the animations included float values representing the individual joint transforms for the bones of characters appearing in the animations. It should be noted that these joint transforms are character agnostic; that is, the same transforms can be applied to any of the characters in an animation, provided the transforms can be rigged to those characters. Often the animation data is used on several characters, so there is not a one-to-one mapping between specific characters and the individual joint transforms.

The raw data set was manually pre-processed to identify events occurring frequently enough to be used for training the machine learning model. Of the total of 41 events (i.e. different types of motion), 3 were chosen for the example model. These events corresponded to cloth, footsteps, feet, with the events occurring 413, 296 and 143 times respectively. Here, cloth represents events where the clothing of a character is rubbing against itself or some other aspect of the character. For example, if the character is waving their arms in the air without moving their feet, cloth sounds will be generated when the arms are fully stretched (representing the clothing being pulled, so making a sound). Footsteps represent the sound made when the foot hits the ground when walking. 'Feet' sounds represent scrapes and scuffs made when the feet are suddenly used to change direction/brace/stop.

In a pre-processing stage, a filtering operation was performed on the data defining the bones and transforms for each event. The dataset included 214 different bones, of which 68 were identified as being relevant for training. Bones defining e.g. fingers, face, etc. and non-frequently occurring ones were removed from the data set. This left bones controlling the torso, arms and legs and feet. Of the transforms included in the dataset, 40 of 44 bones were used. 422 (bone, transform) pairs were selected as features for training the model.

Following the pre-processing stage, the filtered data was input to the machine learning model. The model consisted of a 1 Dimension, 10-layer convolutional neural network outputting scores in [0, 1] range for each label (each label corresponding to one of 'cloth', 'footsteps' or 'feet'), where 1 represents the maximum probability for that label. The frames were grouped in 3-frame groups, to allow for minor errors in the animation tagging/timing.

Figure 6:
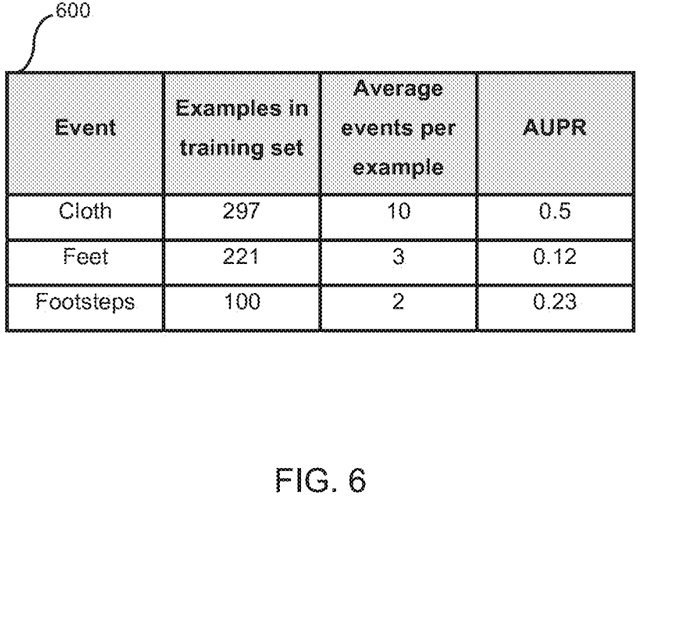
FIG. 6 shows an example of the results obtained using a 10-layer convolutional neural network trained to map transform data to corresponding identifiers.

FIG. 6 shows the results obtained for filtered data and the deep learning architecture described above. In FIG. 6, table 600 shows a column indicating the area under precision-recall (AUPR). As is known in the art, the AUPR provides an indication of a measure of performance of the machine learning model. The closer the AUPR is to 1, the better the performance of the machine learning model. Specifically, the closer the AUPR is to 1, the higher the recall and the higher precision, where a high precision relates to a low false positive rate, and a high recall relates to a low false negative rate. In table 600 it can be seen that, for example, an AUPR of 0.5 was obtained for cloth events.

In table 600, the final column 604 indicates the 'baseline AUPR' for each class. The baseline AUPR corresponds to the proportion of the positives for a certain class. That is, the number of frames that the event occurs in divided by the number of overall frames. For example, if there are 1000 frames in the dataset, and 'footsteps' occurs 10 times, then the baseline for AUPR will be $10/1000=0.01$. This gives the baseline AUPR for that particular event class, i.e. the AUPR that one would get from random guessing. This approach shows that the AUPR (column 602) is significantly higher than the baseline, which demonstrates that the described system is working (and not guessing randomly).

It will be appreciated that the accuracy of the model could be improved further by using a larger training data-set. It will also be appreciated that the resulting tagging of input frames, even when not perfect, serve to reduce the workload of a manual tagging process, making it a corrective/editing procedure applicable only to a small proportion of tags/events.

In some examples, it may be desirable to use a self-supervised deep learning technique to identify the different types of motion being performed by an animated object. For example, an unsupervised learning algorithm may be used to classify different bones and temporal variations in the corresponding transforms as corresponding to different motions (e.g. walking, jumping, skidding, cloth movement, etc.). The unsupervised learning algorithm may also be used to determine the bones and corresponding transforms that are relevant to each type of motion. This would alleviate some of the burden on the developer, since the developer would not need to manually identify the different events occurring in the animation and the bone and transform data relevant to those events.

Having identified the bones and transforms relevant to each event in this way, the identifiers associated with the frames comprising these events may be input to a supervised deep learning algorithm, along with the relevant bone and transform data for each frame. The identifiers may be pre-existing in that they have been defined by an animator beforehand, when generating the animation (as described previously). The supervised learning algorithm may correspond to any of the machine learning models described previously herein. Once trained, the supervised learning algorithm can be used to predict identifiers for other frames, based on a temporal variation in the transforms of one or more bones associated with those frames.

In additional or alternative examples, a machine learning model may be trained to map changes in pose in video data (which is more readily available) to corresponding temporal variations in transform data (applying to animations). This would enable changes in pose of a character in a video to be mapped to an animation of a corresponding character. The temporal variations in transform may then be mapped to a corresponding tag (as described above) so that e.g. corresponding audio events can be synchronized with the actions performed by the animated character.

The techniques described herein may be implemented in hardware, software or combinations of the two as appropriate. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method of determining identifiers for tagging frames of an animation, the method comprising:
   obtaining data indicating motion of an animated object in a plurality of frames;
   detecting the object as performing a pre-determined motion in at least some of the plurality of frames;
   determining, for a given frame, based on the detected pre-determined motion, whether to associate an identifier with the pre-determined motion, the identifier indicating an event that is to be triggered in response to the pre-determined motion;
   tagging the frames of the animation comprising the detected pre-determined motion responsive to the determination to associate an identifier with the pre-determined motion to thereby associate an identifier with a tagged frame, wherein an identifier associated with a tagged frame indicates an event to be triggered in synchronization with the tagged frame; and
   wherein detecting the pre-determined motion and determining the corresponding identifier associated with the tagged frame comprises inputting the obtained data to a machine learning model, the machine learning model being trained to map data indicating motion of an animated object to corresponding identifiers, and wherein the machine learning model is trained to determine the corresponding identifier associated with the tagged frame, and
   wherein the determined identifier indicates an audio event that is to be triggered in response to the detected pre-determined motion.

2. A method according to claim 1, wherein the determined identifier indicates:
   an in-game event that is to be triggered by a game engine, wherein the game engine is configured to receive the determined identifier.

3. A method according to claim 1, wherein the animated object comprises a computer-generated character; and wherein detecting the pre-determined motion comprises detecting the character as performing one of a plurality of pre-determined motions.

4. A method according to claim 3, wherein the obtained data comprises pose data indicating a pose of the character; and wherein detecting the pre-determined motion comprises determining whether a change in pose over successive frames corresponds to at least one of a plurality of pre-determined changes in pose.

5. A method according to claim 4, wherein the character comprises a plurality of bones defining a skeleton of the character; and wherein the pose data comprises at least some of the bones of the character and the corresponding transforms, wherein each transform defines at least one of a position, scale and orientation of a respective bone.

6. A method according to claim 5, wherein detecting the pre-determined motion comprises detecting a change in the transforms of at least one of the bones over successive frames as corresponding to at least one of a plurality of pre-determined changes in transforms.

7. A method according to claim 4, wherein the model comprises a neural network, the neural network being configured to map changes in pose over successive frames to corresponding identifiers.

8. A method according to claim 1, wherein the identifier indicates an audio event associated with the detected motion, the method comprising:
selecting, based on the determined identifier, a sound effect for synchronization with the frames tagged with the identifier; and
synchronizing the selected sound effect with the tagged frames.

9. A method according to claim 8, comprising outputting audio-visual content comprising the tagged frames of the animated object and the synchronized sound effect at a computing device.

10. A non-transitory, computer readable storage medium containing a computer program comprising computer-implemented instructions that, when run on a computer, cause the computer to implement a method of determining identifiers for tagging frames of an animation, the method comprising:
obtaining data indicating motion of an animated object in a plurality of frames;
detecting the object as performing a pre-determined motion in at least some of the plurality of frames;
determining, for a given frame, based on the detected pre-determined motion, whether to associate an identifier with the pre-determined motion, the identifier indicating an event that is to be triggered in response to the pre-determined motion;
tagging the frames of the animation comprising the detected pre-determined motion responsive to the determination to associate an identifier with the pre-determined motion to thereby associate an identifier with a tagged frame, wherein an identifier associated with a tagged frame indicates an event to be triggered in synchronization with the tagged frame; and
wherein detecting the pre-determined motion and determining the corresponding identifier associated with the tagged frame comprises inputting the obtained data to a machine learning model, the machine learning model being trained to map data indicating motion of an animated object to corresponding identifiers, and wherein the machine learning model is trained to determine the corresponding identifier associated with the tagged frame, and
wherein the determined identifier indicates an audio event that is to be triggered in response to the detected pre-determined motion.

11. A system for tagging frames of an animation with respective identifiers, the system comprising:
a motion unit configured to obtain data indicating motion of an animated object in a plurality of frames;
a modelling unit configured to identify the object as performing a pre-determined motion in at least some of the frames and to determine, for a given frame, whether to associate an identifier with the pre-determined motion, the identifier indicating an event that is to be triggered in response to the identified pre-determined motion; wherein the modelling unit comprises a machine learning model trained to map data indicating motion of animated objects to corresponding identifiers; and
a tagging unit configured to tag the frames of the animation comprising the detected pre-determined motion responsive to the determination to associate an identifier with the pre-determined motion to thereby associate an identifier with a tagged frame, wherein an identifier associated with a tagged frame indicates an event to be triggered in synchronization with the tagged frame; and
wherein detecting the pre-determined motion and determining the corresponding identifier associated with the tagged frame comprises inputting the obtained data to a machine learning model, the machine learning model being trained to map data indicating motion of an animated object to corresponding identifiers, and wherein the machine learning model is trained to determine the corresponding identifier associated with the tagged frame, and
wherein the determined identifier indicates an audio event that is to be triggered in response to the detected pre-determined motion.

12. A system according to claim 11, wherein the animated object comprises a computer-generated character and the motion unit is configured to obtain pose data indicating a pose of the character over successive frames; and wherein the modelling unit is configured to identify the object as performing at least one of a plurality of pre-determined motions based on changes in pose of the character over successive frames.

13. A system according claim 11, wherein the pose data comprises bones defining a skeleton of the character and respective transforms of the bones; and wherein the modelling unit is configured to detect the pre-determined motion based on a variation in the transforms of one or more bones, over successive frames.

14. A system according to claim 11, comprising:
a storage unit for storing a plurality of sound effects; and
a synchronization unit configured to select a sound effect from the storage unit for synchronizing with frames tagged with an identifier;
wherein the synchronization unit is configured to select the sound effect based on the identifier with which the tagged frames are tagged; and
wherein the synchronization unit is configured to synchronize the selected sound effect with the tagged frames.

15. A system according to claim 14, comprising an output unit, the output unit being configured to output audio-visual content, the audio-visual content comprising the tagged frames of the animated object and the synchronized sound effect.

* * * * *